Feb. 24, 1925. 1,527,819
J. C. PEDERSEN ET AL
TURNABLE HEADLAMP SUPPORT FOR VEHICLES
Filed Jan. 12, 1923
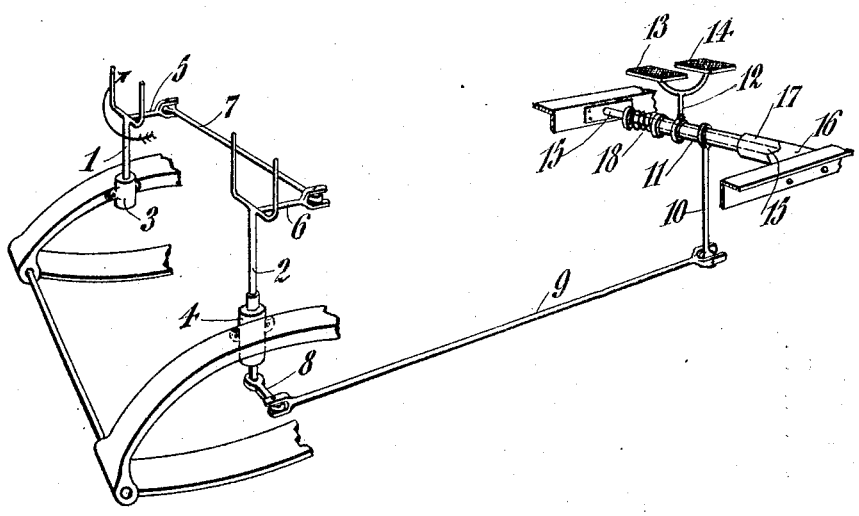
INVENTORS
Joseph Christian Pedersen
Aksel Larsen
Hans Viggo Rasmussen
BY C. P. Goepel
ATTORNEY.

Patented Feb. 24, 1925.

1,527,819

UNITED STATES PATENT OFFICE.

JOSEPH CHRISTIAN PEDERSEN AND AKSEL LARSEN, OF HOLBAEK, AND HANS VIGGO RASMUSSEN, OF MAARSO ST., DENMARK, ASSIGNORS TO SAID PEDERSEN AND THEODOR NIELSEN, OF HYLDEGAARD, DENMARK.

TURNABLE HEADLAMP SUPPORT FOR VEHICLES.

Application filed January 12, 1923. Serial No. 612,325.

*To all whom it may concern:*

Be it known that we, JOSEPH CHRISTIAN PEDERSEN, AKSEL LARSEN, and HANS VIGGO RASMUSSEN, subjects of the King of Denmark, residing at Holbaek, Holbaek, and Maarso St., respectively, in the Kingdom of Denmark, have invented certain new and useful Improvements in Turnable Headlamp Supports for Vehicles, of which the following is a specification.

The present invention relates to an arrangement in connection with turnable head lamp supports for vehicles.

It is known to use in vehicles turnable head lamp supports, for instance, of the kind which is connected with a steering member of the vehicle in such a manner that the head lamps will follow exactly the movements of the front wheels.

Such an arrangement, however, often presents the disadvantage that the part of the road which it is desired to light, is not lighted, and also that objects on the sides of the road which it may be important to light cannot be lighted when running along a straight road.

According to the present invention a movable head light support is produced which can be turned at will by the driver of the vehicle and which is of a simple construction and which can therefore be easily and cheaply manufactured.

A constructional form of an arrangement according to the present invention is shown on the drawing which presents in perspective view the head light supports and their link connections.

1 and 2 indicate the head light supports turnably mounted in bearings 3 and 4, respectively. The said supports are in known manner provided with arms 5 and 6, respectively, which are connected by means of a connecting rod 7.

The support 2 is provided with a steering arm 8 connected with an arm 10 by means of a steering rod 9. The arm 10 is mounted on a hollow shaft 11 which may, for instance, be arranged below the foot board at the driver's feet. The shaft 11 is provided with another arm 12 having two pedals, 13 and 14.

The shaft 11 is rotatably mounted on a spindle 15 fixed to the frame of the vehicle. At the one end of the spindle 15 is provided a fixed member 16 having a notch into which is pressed by means of a spring 18 a projection on a member 17 on the shaft 11, when the head light support is in its mean position.

The manner of operation of the arrangement is as follows:

If, for instance, it is desired to turn the support in the direction indicated by the arrow the driver will press down the foot pedal 14 thereby moving the member 17 to the right (of the driver) against the action of the spring 18 and thus moving the steering rod 9 in a forward direction. The connecting rod 7 will, consequently, move in a lateral direction to the left (of the driver).

If the pedal be disengaged the head light supports will return to the mean position by the spring forcing the member 17 into the notch in the member 16.

By pressing down the pedal 13 the head light supports will be turned in the opposite direction.

The invention is not limited to the constructional form shown on the drawing the details of which may be varied in many ways. For instance, the pedals 13 and 14 may be replaced by a hand lever fixed to the arm 12.

We claim:

The combination with a vehicle having two pivotally mounted interconnected headlights and an arm operatively connected with one of the headlight mountings adapted to be operated for simultaneously turning both headlights, of a connecting link pivotally connected at one end with said arm and extending rearwardly, a spindle connected across the frame of the vehicle, a shaft pivotally mounted on said spindle, an arm secured on said shaft and pivotally connected with the rear end of said connecting link, a cam provided with a depression arranged on said spindle adjacent to one end thereof, a follower member on the end of said shaft adapted to seat in the depression in the cam, a spring on said spindle engaging said shaft for urging the cam and follower so that the follower is normally in said depression and for returning the members to said position but yieldable to permit the shaft to be rotated in one direction or the other and thereby turn the cam and follower with respect to each other and the headlight from their normal forward projecting position to one side or the other, and an operating lever for manually rocking said shaft for turning the headlights to one side or the other.

In testimony whereof we affix our signatures.

JOSEPH CHRISTIAN PEDERSEN.
AKSEL LARSEN.
HANS VIGGO RASMUSSEN.